US008472783B2

(12) United States Patent
Alexander

(10) Patent No.: US 8,472,783 B2
(45) Date of Patent: Jun. 25, 2013

(54) SYSTEMS AND METHODS FOR DIGITAL VIDEO HIGH ACCURACY FAST FORWARD, REWIND AND SKIP

(75) Inventor: Michael Alexander, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 268 days.

(21) Appl. No.: 12/957,148

(22) Filed: Nov. 30, 2010

(65) Prior Publication Data

US 2012/0134646 A1 May 31, 2012

(51) Int. Cl.
*H04N 9/80* (2006.01)
(52) U.S. Cl.
USPC ........................ 386/241; 386/E9.011
(58) Field of Classification Search
USPC ............... 386/241, E9.011, 343, 344
See application file for complete search history.

(56) References Cited

U.S. PATENT DOCUMENTS

| 5,577,190 | A | 11/1996 | Peters ........................... 395/501 |
| 5,614,940 | A | 3/1997 | Cobbley et al. .................... 348/7 |
| 5,659,539 | A | 8/1997 | Porter et al. ............. 395/200.61 |
| 5,949,948 | A * | 9/1999 | Krause et al. ................... 386/350 |
| 5,956,716 | A | 9/1999 | Kenner et al. .................... 707/10 |
| 5,991,502 | A | 11/1999 | Kawakami et al. ............ 386/109 |
| 6,167,083 | A | 12/2000 | Sporer et al. ............. 375/240.01 |
| 6,233,389 | B1 | 5/2001 | Barton et al. .................... 386/46 |
| 6,304,714 | B1 | 10/2001 | Krause et al. .................... 386/52 |
| 7,493,020 | B2 | 2/2009 | Liu et al. |
| 7,826,712 | B2 * | 11/2010 | Minnick et al. ................ 386/241 |
| 8,238,718 | B2 * | 8/2012 | Toyama et al. ................ 386/278 |
| 2002/0089901 | A1 * | 7/2002 | Morohoshi et al. ......... 369/30.11 |
| 2003/0165321 | A1 * | 9/2003 | Blair et al. ....................... 386/68 |

FOREIGN PATENT DOCUMENTS

| JP | 2003-230104 A | 8/2003 |
| WO | 97/19552 | 5/1997 |

OTHER PUBLICATIONS

International Search Report and Written Opinion of the International Searching Authority for PCT/US2011/061949 mailed Apr. 27, 2012, 7 pages.
Official action issued by the European Patent Office, Patent Application No. 07 811 582.1-1247 on Oct. 9, 2009, 7 pages.
Singapore Written Opinion issued by the Danish Patent and Trademark Office, Patent Application No. 200901081-0, Feb. 25, 2010, 9 pages.
Examiner's First Report on Patent Application No. 2007290544 issued by the Australian Government, IP Australia on Apr. 6, 2010, 5 pages.
Office action issued by the China State Intellectual Property Office in PRC (China) patent Application No. 200780032284.0 on Jun. 10, 2010, 9 pages.
Office action issued by the Korean Intellectual Property Office, Patent Application No. 10-2009-7004103 on Aug. 3, 2010, 7 pages.

* cited by examiner

*Primary Examiner* — Thai Tran
*Assistant Examiner* — Nien-Ru Yang
(74) *Attorney, Agent, or Firm* — Seed IP Law Group PLLC

(57) ABSTRACT

In various embodiments, a recording and playback manager of a digital video recorder (DVR), set top box, receiver or other device stores and accesses statistics in a statistics file related to average distances between reference frames (e.g., intra frames or I-frames) within blocks of the video data of the recording. Accessing these statistics during playback enables the system to more accurately locate reference frames to display while executing the playback in a trick mode such as fast forward, rewind or skip. The average distance between reference frames for a particular block of video data may be used to jump from one reference frame to the next reference frame in that block during playback in trick mode.

20 Claims, 9 Drawing Sheets

SYSTEMS AND METHODS FOR DIGITAL VIDEO HIGH ACCURACY FAST FORWARD, REWIND AND SKIP

TECHNICAL FIELD

The technical field relates to digital video and more particularly, to apparatus, systems, and methods for providing digital video frames to display during fast forwarding, rewinding or skipping of recorded programming.

BRIEF SUMMARY

In one embodiment, a method for facilitating playing of digital video data is provided. In this embodiment, statistics related to average distances between reference video frames (e.g., intra-frames or I-frames) within blocks of the video data of the recording are stored in a statistics file. Accessing these statistics enables a recording and playback manager to more accurately locate reference frames to display while executing a rewind, fast forward or skip. For example, during a fast forward playback of the recording, the reference frames of the recording are displayed at a rate corresponding to the speed of the fast forward from a point during the recording at which the fast forward starts until receiving a command to end the fast forward.

The statistics may be those regarding average distances in amounts of data (e.g., bytes) detected between reference frames during playback of the recording or, alternatively, during initial recording on the receiving device. As one example, during the first playback of the recording, a recording and playback manager may be configured to determine and store in the statistics file the average distance between reference frames within each block of video data of the recording. As the distance between reference frames may vary throughout the recording, the average distance between reference frames occurring in a particular block within the recording may also vary. The recording and playback manager may then use this stored average distance between reference frames in the statistics file during a subsequent fast forward, rewind or skip process to locate reference frames to display on the presentation device during that particular fast forward, rewind or skip process.

In another embodiment, a non-transitory computer-readable medium is provided. The non-transitory computer-readable storage medium has computer executable instructions thereon, that when executed by a computer processor cause the processor to perform the methods described above and others described herein.

In another embodiment, a system for playing digital video is provided. The system for playing digital video may comprise a storage device and a processor coupled to the storage device, the processor configured to perform the methods described above and others described herein.

BRIEF DESCRIPTION OF THE DRAWINGS

The components in the drawings are not necessarily to scale relative to each other. Like reference numerals designate corresponding parts throughout the several views.

DETAILED DESCRIPTION

A. Environment Overview

Figure 1:
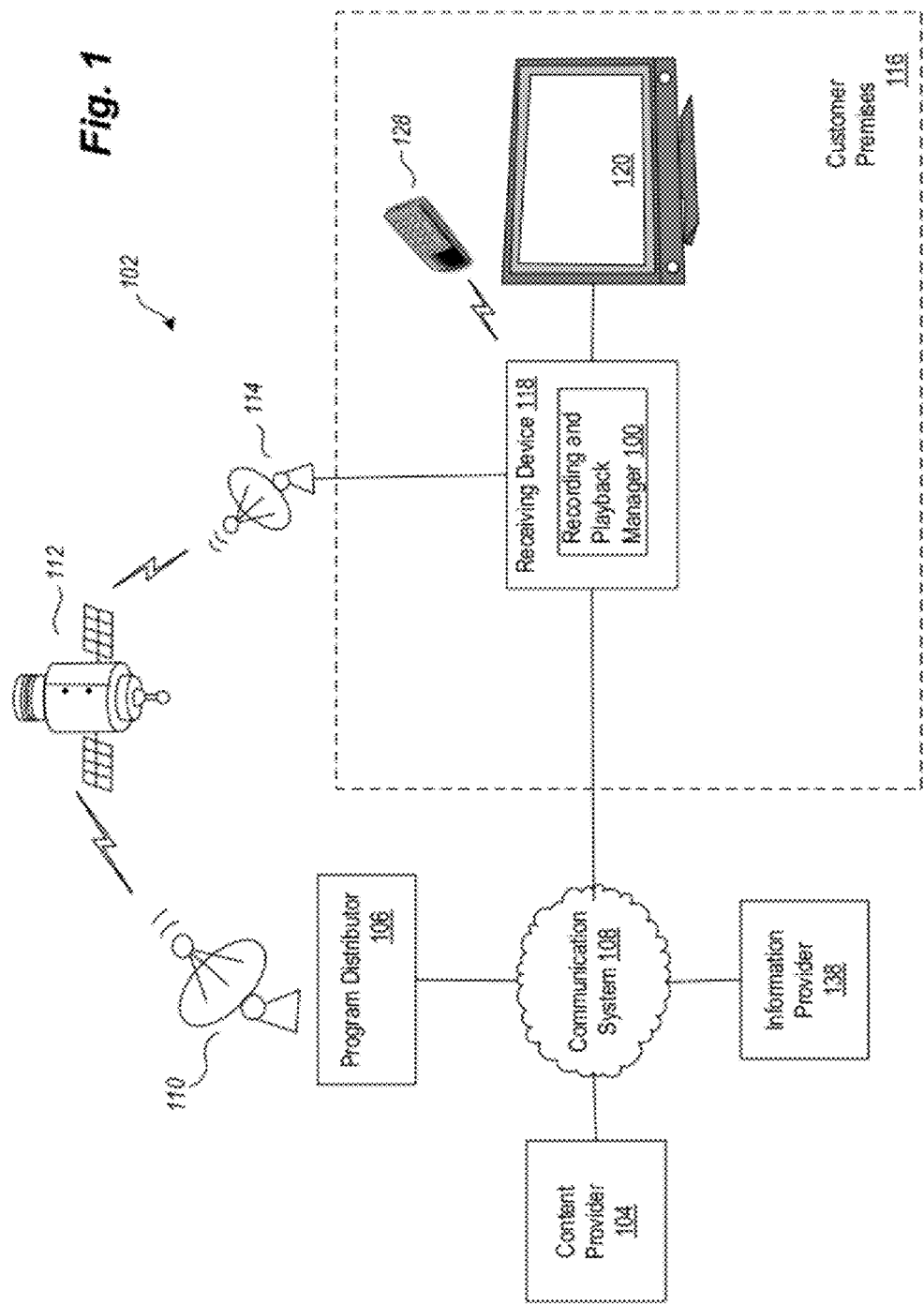
FIG. 1 is a block diagram illustrating an example content distribution environment in which embodiments of a recording and playback manager may be implemented.

FIG. 1 is an overview block diagram illustrating an example content distribution environment 102 in which embodiments of a recording and playback manager 100 may be implemented. The recording and playback manager is operable to record and playback a program or part of a program and to execute fast forward, rewind or skip commands during playback. In this example, the recording and playback manager 100 operates upon a receiving device 118 and is configured to detect a command to fast forward, rewind or skip during playback, and in response, automatically display particular selected frames of the digital video recording in succession at an applicable rate according to the particular speed, length and/or duration of the fast forward, rewind or skip command detected. The recording and playback manager 100 stores and accesses statistics in a statistics file related to average distances between reference frames (e.g., intra-frames or I-frames) within blocks of the data of the recording. Accessing these statistics enables the recording and playback manager 100 to more accurately locate reference frames to display while executing the fast forward, rewind or skip process. Before providing additional details regarding the operation and constitution of the recording and playback manager 100, the content distribution environment 102 of the recording and playback manager 100 will briefly be described.

In the content distribution environment 102, audio, video, and/or data service providers, such as, but not limited to, television service providers, provide their customers a multitude of video and/or data programming (hereafter, collectively and/or exclusively "programming"). Such programming is often provided by use of a receiving device 118 communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive or playback programming. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content, to a distributor, such as the program distributor 106. Example content providers include television stations which provide local or national television programming, special content providers which provide premium based programming or pay-per-view programming.

Program content, interchangeably referred to as a program, is communicated to the program distributor 106 from the content provider 104 through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

In at least one embodiment, the received program content is converted by the program distributor 106 into a suitable signal (a "program signal") that is communicated (i.e., "uplinked") by one or more antennae 110 to one or more satellites 112 (separately illustrated herein from, although considered part of, the communication system 108). The communicated uplink signal may contain a plurality of multiplexed programs. The uplink signal is received by the satellite 112 and then communicated (i.e., "downlinked") from the satellite 112 in one or more directions, for example, onto a predefined portion of the planet.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters. In some embodiments, antenna 114 is a terrestrial "over-the-air" ("OTA") broadcast antenna that is configured to receive a program signal from a terrestrial based transmitter, such as broadcast transmit tower. Furthermore, in some cases, the receiving device 118 is operable to receive signals from multiple, distinct antennas.

The receiver antenna 114 can be located at customer premises 116. Examples of customer premises 116 include a residence, a business, or any other suitable location operable to receive signals from satellite 112. The received signal is communicated, typically over a hard-wire connection, to a receiving device 118. The receiving device 118 converts the received signal from antenna 114 into a signal and/or format suitable for communication to a presentation device 120 or another device, such as another digital video recorder or a home computing system. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The receiving device 118 may receive programming partially from, or entirely from, another source other than the above-described receiver antenna 114. Other embodiments of the receiving device 118 may receive programming from program distributors 106 and/or content providers 104 via locally broadcast RF signals, cable, fiber optic, Internet media, or the like.

In addition, information provider 138 may provide various forms of content and/or services to various devices residing in the customer premises 116. For example, information provider 138 may provide a Web page (or other information) to the receiving device 118 or other computing device. Information provider 138 may further perform or facilitate electronic commerce transactions.

In the illustrated example, the recording and playback manager 100 operates upon the receiving device 118. The recording and playback manager 100 is configured to detect a command to fast forward, rewind or skip during playback of a digital video recording of programming (hereafter referred to as a "recording"), and in response, automatically display particular selected frames of the recording on the display device 120 in succession at an applicable rate according to the particular speed, length and/or duration of the fast forward, rewind or skip command detected.

The recording and playback manager 100 locates digital video reference frames to display while executing the fast forward, rewind or skip process. These reference frames may be frames that were encoded independently from other frames during the digital video encoding of the recording or otherwise contain the necessary rendering information within the frame itself. In other words, the encoding techniques performed for these frames were relative to information that is contained only within the frame itself, and not relative to any other frame in the video sequence. Such frames are also referred to as intra-frames or I-frames, and will be referred to as such hereinafter. Example digital video encoding/compression technique include, but are not limited to MPEG-2 and MPEG-4. For example, MPEG-4 is a standard for a group of audio and video coding formats and related technology agreed upon by the ISO/IEC Moving Picture Experts Group (MPEG) (ISO/IEC JTC1/SC29/WG11) under the formal standard ISO/IEC 14496—Coding of audio-visual objects.

The recording and playback manager 100 is further configured to store statistics regarding average distances in amounts of data between I-frames during playback of the recording or, alternatively, during initial recording on the receiving device 118. As one example, during the first playback of the recording, the recording and playback manager 100 may be configured to determine and store the average distance between I-frames within a block of video data of the recording. The recording and playback manager 100 may then use this stored average distance between I-frames during a subsequent fast forward, rewind or skip process which includes that block to locate I-frames to display on the presentation device during that particular fast forward, rewind or skip process.

The above description of the content distribution environment 102 and the customer premises 116, and the various devices therein, is intended as a broad, non-limiting overview of an example environment in which various embodiments of a recording and playback manager may be implemented. FIG. 1 illustrates just one example of a content distribution environment 102 and that the various embodiments discussed herein are not limited to such environments. In particular, content distribution environment 102 and the various devices therein, may contain other devices, systems and/or media not specifically described herein.

Example embodiments described herein provide applications, tools, data structures and other support to implement a recording and playback manager that facilitates an improved fast forward, rewind or skip process during playback of programs recorded on a receiving device. Other embodiments of the described techniques may be used for other purposes, including storage and playback of data transmissions generally and locating reference frames in stored video data generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Example Recording and Playback Manager Overview

Figure 2:
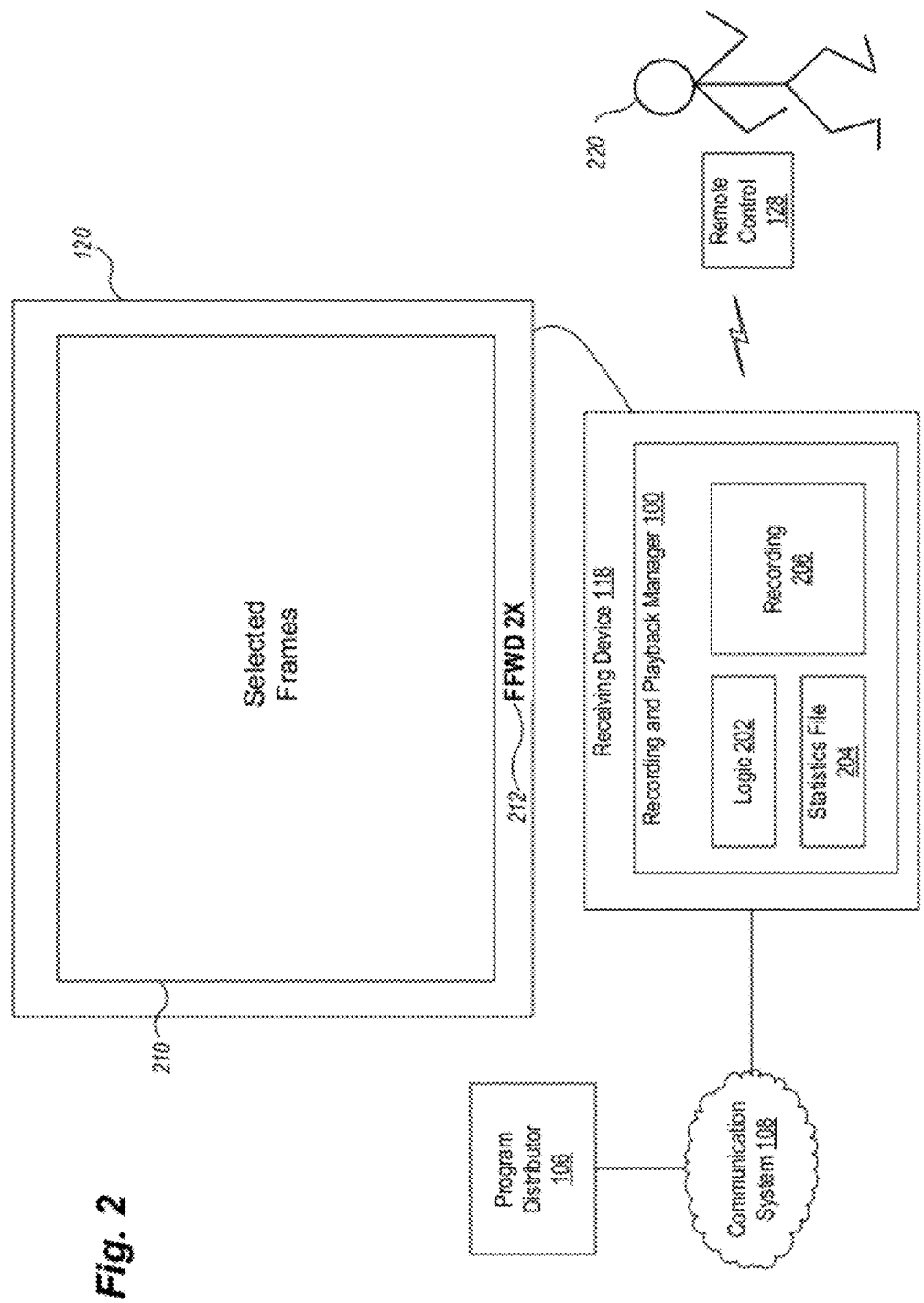
FIG. 2 is a block diagram illustrating example functional elements of an example embodiment.

FIG. 2 is a block diagram illustrating example functional elements of an example embodiment. In particular, FIG. 2 shows an example recording and playback manager 100 executing on a receiving device 118. The illustrated receiving device 118, which may be a set-top box, is communicatively coupled to a presentation device 120 and to a program distributor 106 via communication system 108. A user may 220 operate the receiving device 118 and/or the presentation device 120 using remote-control device 128. The recording and playback manager 100 includes logic 202, a statistics file 204, and at least one recording 206. The statistics file 204 includes statistics regarding average I-frame distance between I-frames of the recording 206.

In a typical example, the user 220 interacts with the recording and playback manager 100 to initiate recording of a program transmitted by the program distributor 106 to the receiving device 118. Initiating recording includes specifying a recording event, which specifies parameters, such as channel, begin time (e.g., current time or some future time), and duration, that are used by the recording and playback manager 100 to record the desired program. As discussed with respect to FIG. 1, above, the program may be transmitted as a program signal to the receiving device 118 in various ways, such as via a satellite network, cable network, terrestrial broadcast, or the like. As the program signal is received by the receiving device 118, the recording and playback manager 100 stores the received program as the recording 206. For example, a tuner and/or selector of the receiving device 118 extracts program data portions (e.g., video and audio data portions) from the received program signal and provide those data portions to the recording and playback manager 100. The recording and playback manager 100 then stores the received data portions as the recording 206.

The recording and playback manager 100 is configured to detect a command from the remote control device 128 to fast forward, rewind or skip during playback of the recording 206, and in response, automatically display particular selected frames 210 of the recording 206 in succession at an applicable rate according to the particular speed, length and/or duration of the fast forward, rewind or skip command detected. The recording and playback manager 100 stores and accesses statistics in a statistics file 204 related to average distances between reference frames (e.g., intra-frames or I-frames) within blocks of the data of the recording 206. Accessing these statistics enables the recording and playback manager 100 to more accurately locate reference frames to display while executing the fast forward, rewind or skip process. For example, during a fast forward 212 playback of the recording 206, the recording and playback manager 100 may display selected frames 210 such as the I-frames of the recording 206 from a point during the recording at which the fast forward 212 starts until receiving a command to end the fast forward 212 at the at a rate corresponding to the speed of the fast forward 212 (e.g., 2× the normal playback speed).

The recording and playback manager 100 is further configured to store statistics regarding average distances in amounts of data (e.g., bytes) between I-frames during playback of the recording or, alternatively, during initial recording on the receiving device 118. As one example, during the first playback of the recording 206, the recording and playback manager 100 may be configured to determine and store the average distance between I-frames within each block of video data of the recording in the statistics file 204. As the distance between I-frames may vary throughout the recording, the average distance between I-frames occurring in a particular block within the recording 206 may also vary. The recording and playback manager 100 may then use this stored average distance between I-frames in the statistics file 204 during a subsequent fast forward, rewind or skip process to locate I-frames to display on the presentation device during that particular fast forward, rewind or skip process, as described further with respect to FIGS. 6 through 10 below.

D. Example Computing System Implementation

Figure 3:
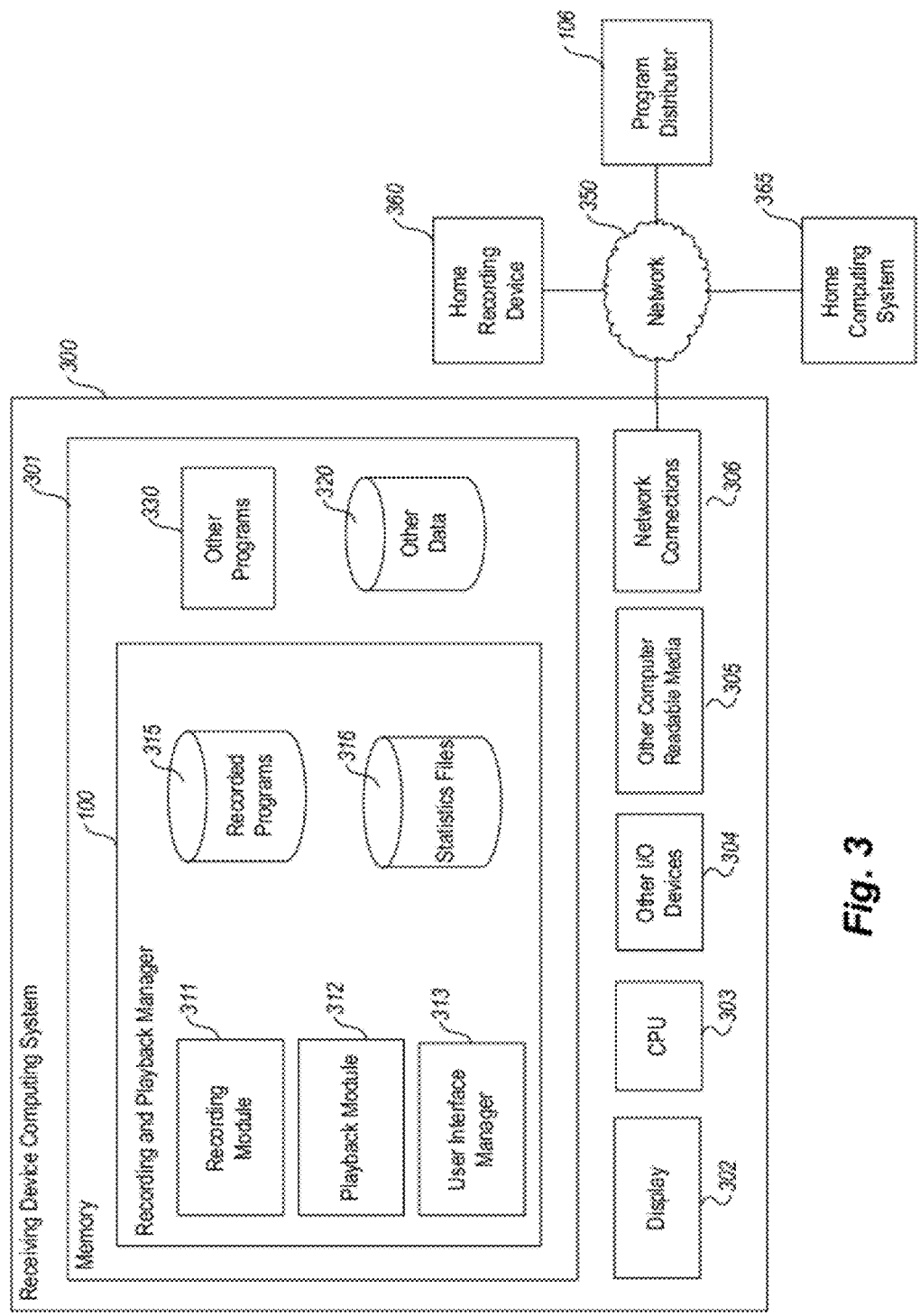
FIG. 3 is a block diagram of a computing system for practicing example embodiments of a recording and playback manager.
Figure 4:
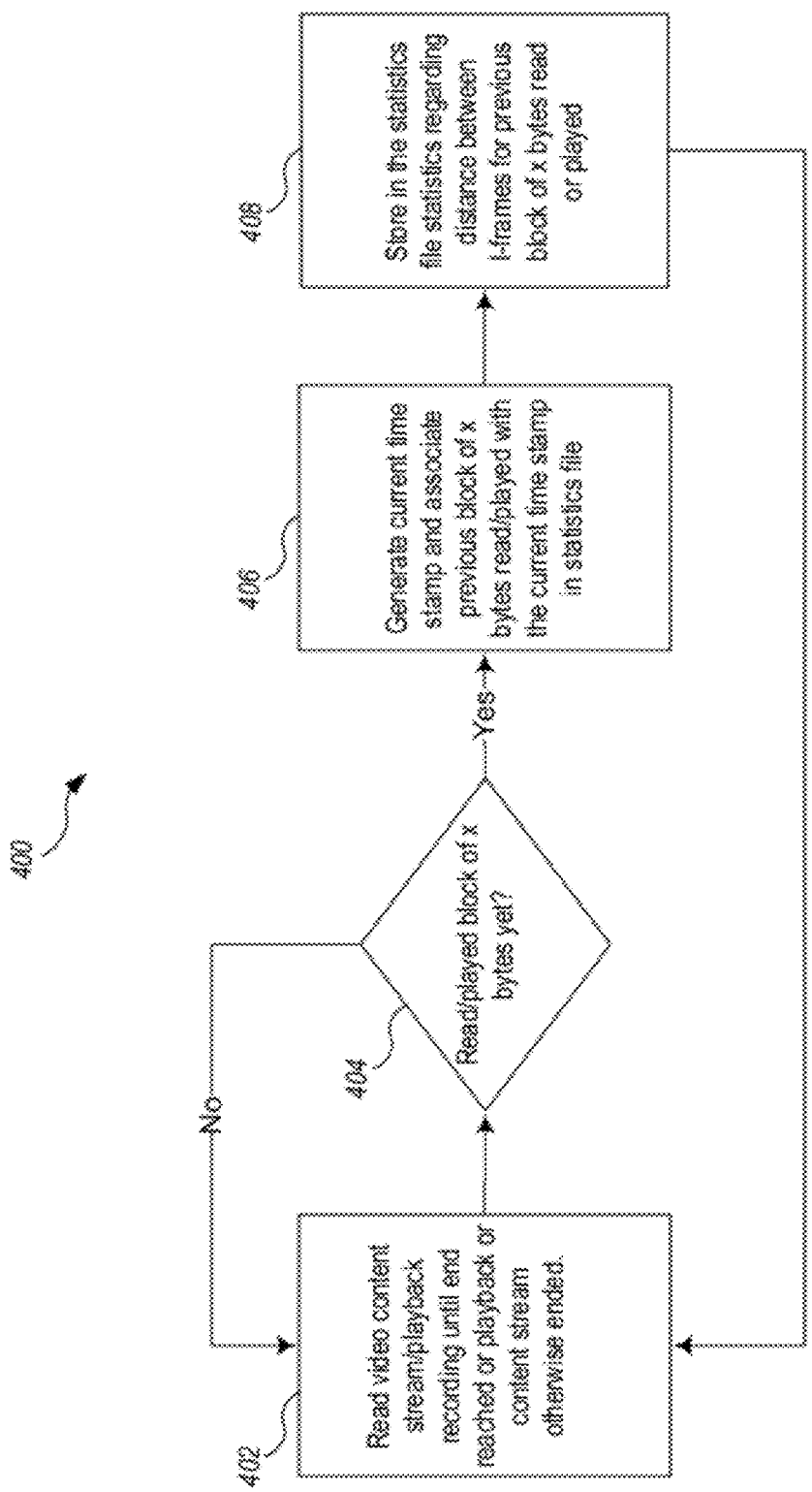
FIG. 4 is a flow diagram of an example recording and playback manager process for gathering recording or playback statistics provided by one example embodiment.

FIG. 3 is a block diagram of a computing system for practicing example embodiments of a recording and playback manager. FIG. 4 shows a receiving device computing system 300 that may be utilized to implement a recording and playback manager 100. In one embodiment, the receiving device computing system 300 is part of a set-top box configured to receive, record and display programming on a presentation device. In other embodiments, the receiving device computing system 300 is part of a presentation device, such as a television or is a digital video recorder (DVR) device.

Note that one or more general purpose or special purpose computing systems/devices may be used to implement the recording and playback manager 100. In addition, the computing system 300 may comprise one or more distinct computing systems/devices and may span distributed locations. Furthermore, each block shown may represent one or more such blocks as appropriate to a specific embodiment or may be combined with other blocks. Also, the recording and playback manager 100 may be implemented in software, hardware, firmware, or in some combination to achieve the capabilities described herein.

In the embodiment shown, receiving device computing system 300 comprises a computer memory ("memory") 301, a display 302, one or more Central Processing Units ("CPU") 303, Input/Output devices 304 (e.g., keyboard, mouse, RF or infrared receiver, CRT or LCD display, and the like), other computer-readable media 305, and network connections 306. The recording and playback manager 100 is shown residing in memory 301. In other embodiments, some portion of the contents, some of, or all of the components of the recording and playback manager 100 may be stored on and/or transmitted over the other computer-readable media 305. The components of the recording and playback manager 100 preferably execute on one or more CPUs 303 and facilitate the recording and playback of programming in normal mode or "trick modes" (e.g., fast forward, rewind and skip) at various speeds or time intervals, as described herein. Other code or programs 330 (e.g., an audio/video processing module, a program guide manager module, a Web server, and the like) and potentially other data repositories, such as data repository 320, also reside in the memory 301, and preferably execute on one or more CPUs 303. Of note, one or more of the components in FIG. 3 may not be present in any specific implementation. For example, some embodiments may not provide other computer readable media 305 or a display 302.

In a typical embodiment, the recording and playback manager 100 may include a recording module 311, a playback module 312, a user interface manager 313, a recording data repository 315 that includes recorded programs, and a data repository 316 that includes statistics files. Other and/or different modules may be implemented. The recording and playback manager 100 may interact via a network 350 with another home recording device 360 (e.g., a digital video recorder), program distributor 106, and home computing system 365 (e.g., a desktop computer, a laptop computer).

The recording module 311 provides the recording functions of the recording and playback manager 100. For example, the recording module 311 initiates and performs recordings, by directing program content received by the computing system 300 to be stored in recording data repository 315. In one embodiment, the recording module 311 may also be configured to store, in a corresponding statistics file in data repository 316, statistics regarding the average distance between I-frames while recording video.

The playback module 312 may be configured to play particular recordings stored in the data depository 315. If not stored during the initial recording, the playback module 312 may be configured to access the corresponding statistics file for that recording to store statistics regarding the average distance between I-frames during the initial playback of the recording. During subsequent playback of the recording, the playback module 312 may access the corresponding statistics file to obtain the previously stored statistics regarding the average distance between I-frames for that recording. The playback module 312 may then utilize these statistics to locate I-frames to display during the fast forward, rewind or skip process for that recording.

The user interface manager 313 provides a view and a controller that facilitate user interaction with the recording and playback manager 100 and its various components. For example, the user interface manager 313 provides interactive graphical user interface screens to notify the user of the current playback mode (e.g., fast forward, rewind, or skip), a change in playback mode, or the particular speed or time interval associated with the current playback mode. The user interface manager 313 may also provide the user with controls for specifying the operation of the recording and playback manager 100 including selection of a playback mode, pause, stop, slow motion, and other controls. The user interface manager 313 also receives input from a user (e.g., in the form of user interface events) and translates those inputs into the appropriate command for initiation by the recording and playback manager 100.

In some embodiments, the recording and playback manager includes an application program interface ("API") that provides programmatic access to one or more functions of the recording and playback manager 100. For example, such an API may provide a programmatic interface to one or more functions of the recording and playback manager 100 that may be invoked by one of the other programs 330 or some other module. In this manner, the API may facilitate the development of third-party software, such as user interfaces, plug-ins, adapters (e.g., for integrating functions of the recording and playback manager 100 into desktop applications), and the like.

In addition, the API may be in at least some embodiments invoked or otherwise accessed via remote entities, such as the home recording device 360, the program distributor 106, or the computing system 365, to access various functions of the recording and playback manager 100. For example, a user operating the computing system 365 may schedule a recording or perform playback in various modes by the recording and playback manager 100 via the API.

The recording data repository 315 stores one or more recorded programs received by the computing system 300, such as the recording 206 described with respect to FIG. 2. When a user indicates a desire to view a recorded program in a various playback mode, the recording and playback manager 100 initiates playback of the recorded program from the recording data repository 315 in the desired playback mode (e.g., fast forward, rewind, or skip).

The data repository 316 stores statistics files for each recording in the data repository. Such information may include statistics regarding the average distance between I-frames for particular blocks within the recording, time stamps correlating at which time the block was recorded and other recording statistics.

In some embodiments, the recording and playback manager 100 interacts with the home recording device 360 and/or the home computing system 365 for various purposes. For example, the recording and playback manager 100 may schedule a recording to be made by the home recording device 360, such as when the recording and playback manager 100 has multiple recording events scheduled for the same or overlapping time period. In other cases, such as when data store 315 has reached its maximum capacity or the computing system 300 is itself not configured to record programs, the recording and playback manager 100 may utilize the home recording device 360 to store recorded programs.

In an example embodiment, components/modules of the recording and playback manager 100 are implemented using standard programming techniques. For example, the recording and playback manager 100 may be implemented as a "native" executable running on the CPU 303, along with one or more static or dynamic libraries. In other embodiments, the recording and playback manager 100 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

In a software or firmware implementation, instructions stored in a memory configure, when executed, one or more processors of the computing system 300 to perform the functions of the recording and playback manager 100. In one embodiment, instructions cause the CPU 303 or some other processor, such as an I/O controller/processor, to record programs, such as by consuming program data and writing it to a disk or other storage device, by initiating a suitable DMA operation, or the like. Similarly, the CPU 303 or other processor may be configured to perform other operations such as playing recording in various playback modes.

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a recording and playback manager implementation. Also, other functions could be implemented and/or performed by each component/module, and in different orders, and by different components/modules, yet still achieve the functions of the recording and playback manager.

In addition, programming interfaces to the data stored as part of the recording and playback manager 100, such as in the recording data repository 315 and data repository 316, can be available by standard mechanisms such as through C, C++, C#, and Java APIs; libraries for accessing files, databases, or other data repositories; through scripting languages such as XML; or through Web servers, FTP servers, or other types of servers providing access to stored data. The recording data repository 315 and data repository 316 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a recording and playback manager.

Furthermore, in some embodiments, some or all of the components of the recording and playback manager 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

E. Processes

FIG. 4 is a flow diagram of an example recording and playback manager process for gathering recording or playback statistics provided by one example embodiment. In particular, FIG. 4 illustrates process 400 that may be implemented by, for example, one or more modules/components of the recording and playback manager 100 executing on the receiving device 118, as described with respect to FIGS. 1 through 3.

At 402, the process reads a digital video content stream of a program for recording the program and/or playing the program. The video content stream may be from various sources such as streaming video received over a network or from a previous recording 206 described with respect to FIG. 2 that is stored in recording data repository 315 described with respect to FIG. 3. The reading of the content stream may continue until the end of the content stream is reached or it is otherwise ended (e.g., by a stop command).

At 404, the process determines whether a particular amount of data has been read or played (e.g., x bytes of data). This particular amount of data may correspond to a predetermined block size into which the recording may be divided for purposes of gathering statistics regarding a particular block of video data within the recording. In one embodiment, the block size may be 1.5 MB. However, the block size may vary and be determined according to various characteristics of the video content of the content stream, recording, video coding method, desired performance, or processing capabilities of the device on which the recording is being played or stored in order to increase overall recording and playback performance in various modes.

At 406, if it has been determined that a block of data has been read or played, then a time stamp is generated according to the current time and is associated with the block previously read. This association may be stored in a searchable statistics file or other file corresponding to the content stream being read. If it had been determined at 404 that an entire block of data has not been read, the process then continues back to 402 such that the content stream will continue to be read until the end of the content stream is reached or it is otherwise ended.

At 408, the process stores in the statistics file statistics regarding the distance between I-frames for the previous block read. These statistics may be regarding or related to average distances in amounts of data (e.g., bytes) between reference frames (e.g., intra-frames or I-frames) within the previous block read. The average distance may be calculated by calculating the number of reference video frames read within a block of digital video data (e.g., by keeping a running total of I-frames encountered during reading of the content stream at 402 for each block) and dividing the block size by this running total number of I-frames for the previous block to obtain the average distance between I-frames for the previous block. At 408, this average distance may be associated with the previous block and this association and average distance may be stored in the statistics file. Other related statistics associated with the previous block, blocks or the entire content stream read or recording played may also be stored in the statistics file including, but not limited to: standard deviation statistics for each block regarding the distances between I-frames for a particular block or as compared to other blocks, mean distance between I-frames, percentages of I-frames falling within particular distances, total number of I-frames for a particular block, weighted calculations based on total number of I-frames in a particular block, ratios of number of I-frames to block size, volatility regarding number of I-frames encountered between blocks or sub-blocks, etc.

At 408, the process may continue to 402 and repeat until the end of the content stream is reached or it is otherwise ended.

Some embodiments perform one or more operations/aspects in addition to the ones described with respect to process 400. For example, in one embodiment, process 400 may stop when playback of a recording is disrupted or otherwise ended before the end of the recording is reached, but will then continue to store statistics in the same statistics file associated with the recording during a subsequent playback of the recording in order to obtain statistics on the rest of the recording.

Figure 5:
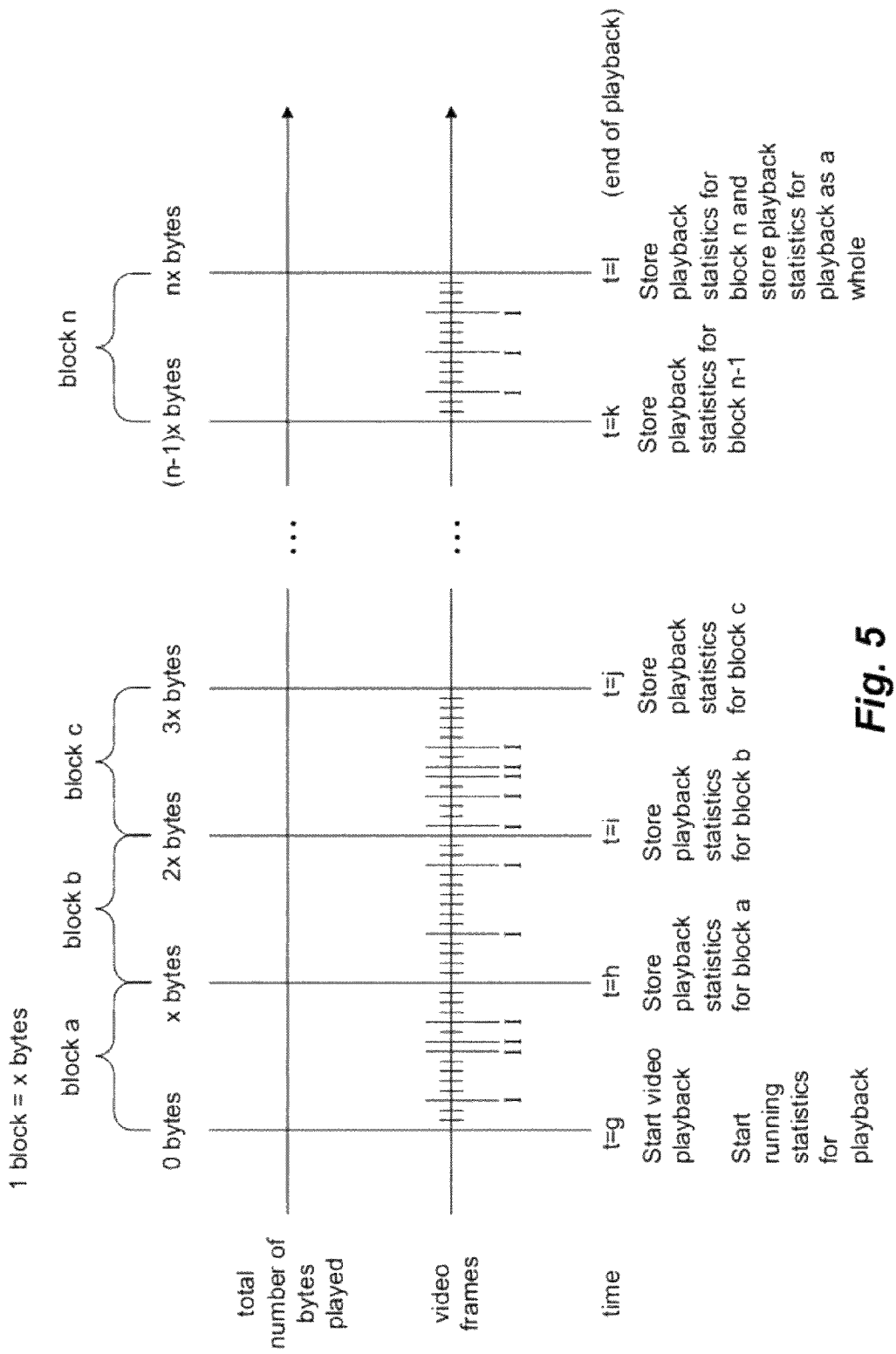
FIG. 5 is a chart showing example intra-frame (I-frame) placement and blocks of an example recording during the process of gathering recording or playback statistics provided by one example embodiment.

FIG. 5 is a chart showing example intra-frame (I-frame) placement and blocks of an example recording during the process of gathering recording or playback statistics provided by one example embodiment according to the process of FIG. 4.

The playback of the recording starts at time t=g. As blocks are read and played, various running statistics may be kept. For example, a running total of bytes played, and a running total of I-frames encountered may be kept during playback. As each block of x bytes is played, playback statistics are stored in a statistics file for the particular block previously played.

As shown in FIG. 5, at time t=h, x blocks have been played, which triggers the process to store statistics for that first block (e.g., block a) and the associated timestamp h in the statistics file. The timestamp may be in various formats showing time elapsed relative to a particular previous point in time. The timestamp may be Unix epoch time (or converted from Unix epoch time), time elapsed since the start of playback of the recording, or some other previous point. The statistics stored may be those as described above related to the average distance between I-frames for the previous block played. For example, at t=h, as shown in FIG. 5, four I-frames have been played, each denoted by the "I" label on the "video frames" line between t=g and t=h. If the block size is 1.5 MB (e.g., x=1.5 MB) then the average distance between the I-frames for block a is 1.5 MB/4, which equals 384 KB. In many instances, there will be many more or less I-frames per 1.5 MB block of video data, but the example of FIG. 5 uses 4 I=frames for illustrative purposes. This average distance between I-frames of 384 KB is stored under timestamp h in the statistics file.

Although each block a, b, c . . . n is of the same size, it may not take the same amount of time to play each block. For example, a block of video data with a large amount of motion or number of scene changes may pass quicker than a block which is video of a still scene since each frame of the block of video data with a large amount of motion or number of scene changes has more information in each frame. Such blocks of video having a large amount of motion or number of scene changes will also likely have more I-frames within the block. Therefore, the time elapsed between timestamps may vary widely. For example, the time elapsed between timestamp h and timestamp i for block b may likely be larger than the time elapsed between timestamp i and timestamp j for block c. This may be due to the larger amount of information as indicated by the larger number of I-frames in block c to be played at the same frame-per-second (fps) rate (e.g., approximately 30 fps or 60 fps) as compared to block b.

The process may continue to store the playback statistics for each block until after the last block n is played, at which point playback statistics for the entire recording may be stored such as the average distance between I-frames for the entire recording, and the total number of bytes played (e.g., nx), etc.

Figure 6:
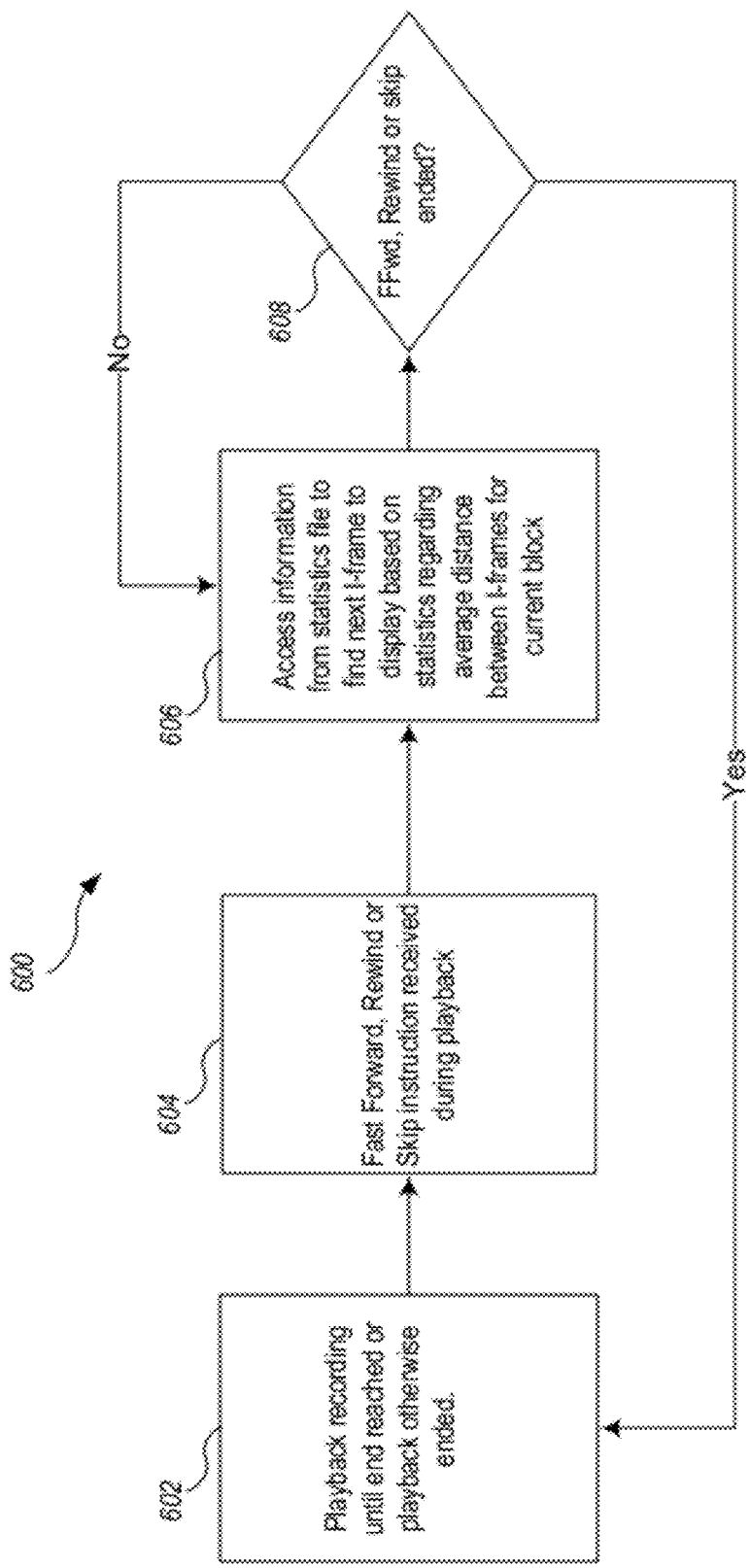
FIG. 6 is a flow diagram of an example playback process during fast forward, rewind or skip provided by an example embodiment.

FIG. 6 is a flow diagram of an example playback process during fast forward, rewind or skip provided by an example embodiment. In particular, FIG. 6 illustrates process 600 that may be implemented by, for example, one or more modules/components of the recording and playback manager 100 executing on the receiving device 118, as described with respect to FIGS. 1 through 3.

At 602, the process plays a previous recording such as recording 206 described with respect to FIG. 2 that is stored in recording data repository 315 described with respect to FIG. 3. The playing of the recording may continue until the end of the recording is reached or playback is otherwise ended (e.g., by a stop command).

At 604, a fast forward, rewind, or skip instruction is received during playback. For example, such an instruction may be received via a remote control device 128 as described above with respect to FIG. 2.

At, 606, because only I-frames are generally displayed during fast forward, rewind or skip playback modes, the statistics file is accessed to find the next I-frame to display based on statistics regarding average distance between I-frames for the current block being played.

At 608, it is determined whether the fast forward, rewind or skip mode has ended. For example, the mode may end based on input received at the receiving device 118 from the remote control device 128. If it has not ended, the process continues to 606 and repeats displaying I-frames as described above until the particular fast forward, rewind or skip mode has ended as determined at 608. If the fast forward, rewind or skip mode has ended, then the process continues to 602 to continue playing back the recording in normal mode.

Figure 7:
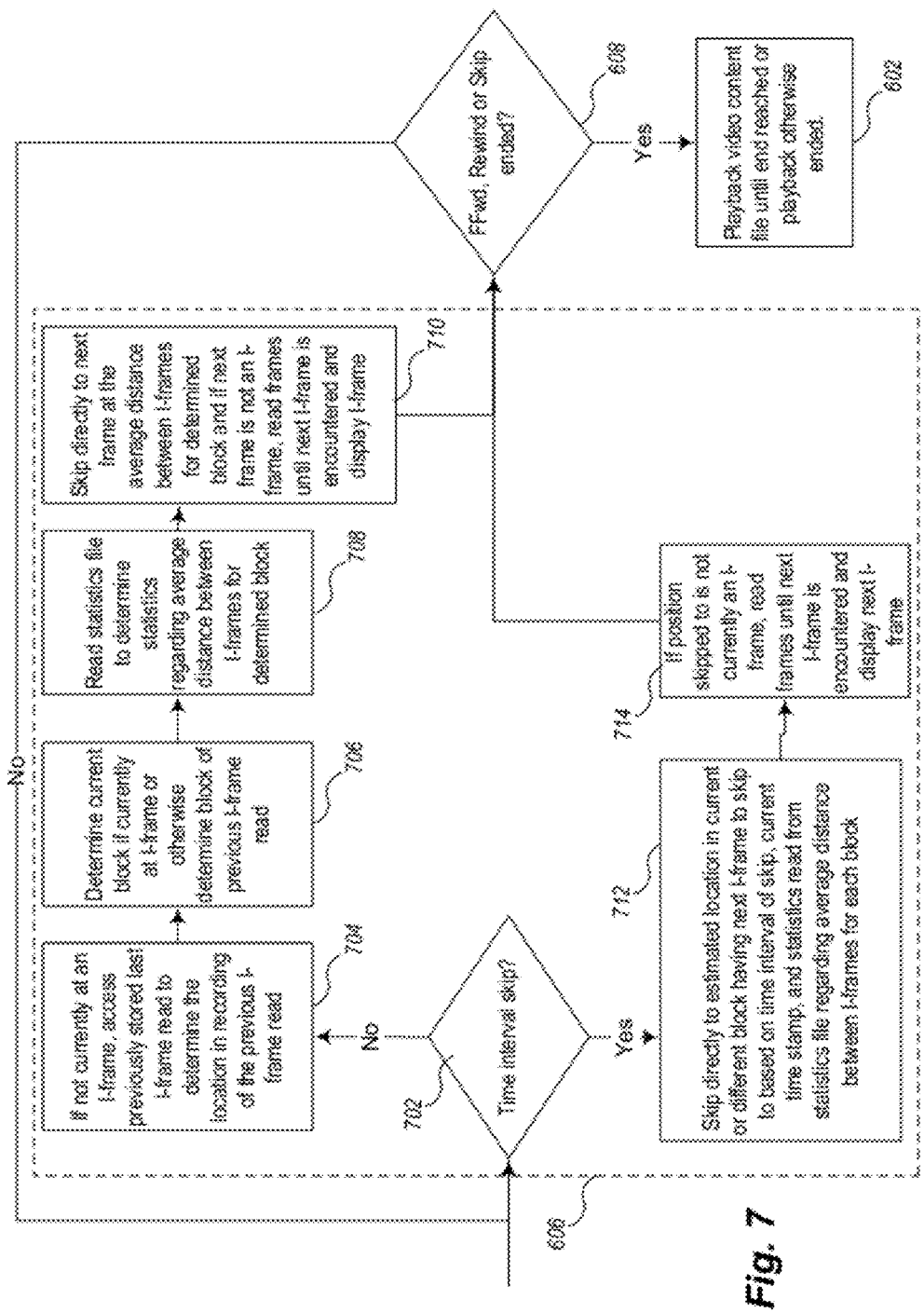
FIG. 7 is flow diagram showing the accessing information from the statistics file portion of the example playback process of FIG. 6.

FIG. 7 is a flow diagram showing the accessing the information from the statistics file portion of the example playback process of FIG. 6. In particular, an example process performed at 606 of FIG. 6 is shown for accessing the statistics file to find the next I-frame to display based on statistics regarding average distance between I-frames for the current block being played. Note that variations to the method shown are contemplated and may be used to access the statistics file to find the next I-frame and that the steps shown may be performed in a different order or have additional steps that also facilitate finding the next I-frame to display based on statistics regarding average distance between I-frames for the current block being played.

At 702, it may be determined whether the current playback mode is a time interval skip mode. For example, a time interval skip mode may be a playback mode which skips forward or backward a particular set amount of amount of time in the recording during playback rather than playing back the recording at normal speed or a multiple of the normal speed (as in fast forward or rewind). For example, in time interval skip mode, instead of playing every I-frame, only particular I-frames are played corresponding to the next position in the recording to skip to.

If the current playback mode is not time interval skip (i.e., it is normal fast forward or rewind), at 704, if the current frame is not an I-frame, the previously stored last I-frame read is accessed to determine the location in the recording of the previous I-frame read. In one embodiment, this location may be determined by obtaining the presentation time stamp (PTS) for the previous I-frame read, which can be correlated to the position in the recording of the previous I-frame read based on the total number of bytes played to the point of the previous I-frame read. As described below, the location in the recording of the previous I-frame read is used as a reference point to locate the next I-frame to display.

At 706, the current block of the recording is determined if the current frame is an I-frame. Otherwise, the block of the previous I-frame read is determined. The current position in the recording (thus the current block) may be determined in various manners such as obtaining the presentation time stamp (PTS) for the current position in the recording, which can be correlated to the position in the recording based on the total number of bytes played so far. The location in the recording of the previous I-frame read may also be obtained in a similar manner as described above.

At 708, the average distance between I-frames for the determined block is found in the statistics file.

At 710, the process skips directly to the next frame at the average distance between I-frames for the determined block in the applicable direction of the current playback mode (e.g., rewind or fast forward). In particular, the average distance between I-frames for the determined block is added to the current position in the recording if currently at an I-frame, or to the location of the previous I-frame read to estimate the location of the next I-frame to display. Each frame is then read starting at the location in the recording to which the process skipped until the next I-frame is encountered. Once encountered, it is displayed (e.g. on the presentation device 212). For example, if the next frame to which the process skips is an I-frame, then the I-frame is displayed. If the next frame to which the process skips is not an I-frame, then frames are read until an I-frame is encountered, at which point the I-frame is displayed. Also, the location in the recording of the previous I-frame played may also be stored for future reference in the manner described above.

At 608, it is determined whether the fast forward, rewind or skip mode has ended. For example, the mode may end based on input received at the receiving device 118 from the remote control device 128. If it has not ended, the process continues to 606 and repeats displaying I-frames as described above until the particular fast forward, rewind or skip mode has ended as determined at 608. If the fast forward, rewind or skip mode has ended, then the process continues to 602 to playback the recording in normal mode.

If it had been determined at 702 that the current playback mode is a time interval skip mode (i.e., it is not a normal fast forward or rewind mode), at 712, the process causes the playback to skip directly in the recording to the estimated location of the next I-frame to skip to based on the time interval of skip, current time stamp, and statistics read from the statistics file regarding average distance between I-frames and total I-frames for each block. As noted above, according to one embodiment, in time interval skip mode, instead of playing every I-frame, only particular I-frames are played corresponding to the next position in the recording to skip to. In the case of skipping forward, since each block in the statistics file is associated with a time stamp recorded in the statistics file at which that block was finished being written, which block to skip to may be determined by adding the amount of time to skip to the current time stamp, presentation time stamp (PTS) for the current position in the recording, or other time stamp correlated to the current frame being played or read (or optionally, the previous I-frame played) to obtain a time position in the recording to skip to.

The total number of and average distance between I-frames for the block in the statistics file which correlates to this time position in the recording to skip to is then used to facilitate finding the next I-frame to display. For example, in skipping forward, the difference between the time stamp of the correlated block and the time position to skip to may be divided by the total time interval for that block to obtain a ratio of the correlated block to be skipped. The total time interval for the correlated block may be obtained by subtracting the time stamp for the block previous to the correlated block from the time stamp of the correlated block. This ratio may then be multiplied by how many total I-frames there exist in the correlated block to obtain a number of I-frames to skip starting from the beginning of that correlated block. This number of I-frames to skip from the beginning of the correlated block may then be multiplied by the average distance in bytes between I-frames for that correlated block as indicated in the statistics file to obtain an exact byte position in the recording to jump to. A similar corresponding process may be performed for skipping backwards.

At 714, if the current frame at the byte position jumped to at 712 is not an I-frame, frames of the recording are read in the direction of the current skip mode until the next I-frame is encountered, at which point the I-frame is displayed. The process then continues to 608 and repeats accordingly as described above.

Figure 8:
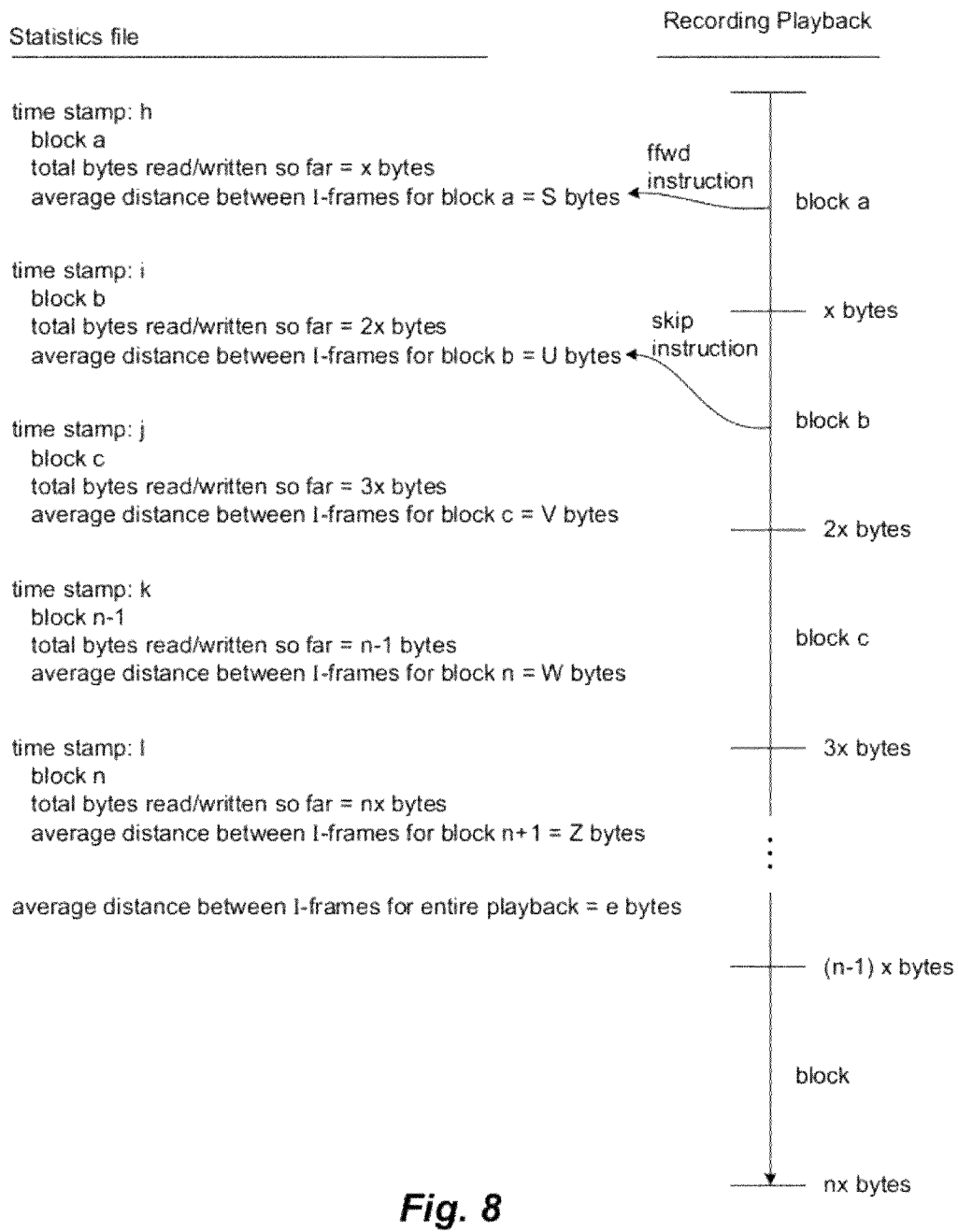
FIG. 8 is a chart showing example utilization of a statistics file during fast forward, rewind or skip provided by an example embodiment.

FIG. 8 is a chart showing example utilization of a statistics file during fast forward, rewind or skip provided by an example embodiment. For example, during playback of block a, a fast forward command is received, at which point the statistics file is accessed to obtain the average distance between I-frames for block a, which was previously recorded as S bytes. This average distance S is then used to jump S bytes within block a. After jumping S, bytes, frames are read until the next I-frame is encountered. Once encountered, the I-frame is displayed. This process repeats until the fast forward mode ends.

As another example, during playback of block b, a skip command is received, at which point the statistics file is accessed to obtain the average distance between I-frames for block b, which was previously recorded as U bytes. The process then jumps to the byte position in the recording corresponding to the time interval to skip as described above. In the present example, the byte position to jump to is located within the same block b. Therefore, this average distance U is then used to calculate how many bytes to jump based on how much of the block is to be skipped according to the current position in the block, the time interval, and total I-frames in the block as described above with respect to FIG. 7. After jumping the calculated amount, frames are read until the next I-frame is encountered. Once, encountered the I-frame is displayed. This process repeats until the skip mode ends.

Figure 9:
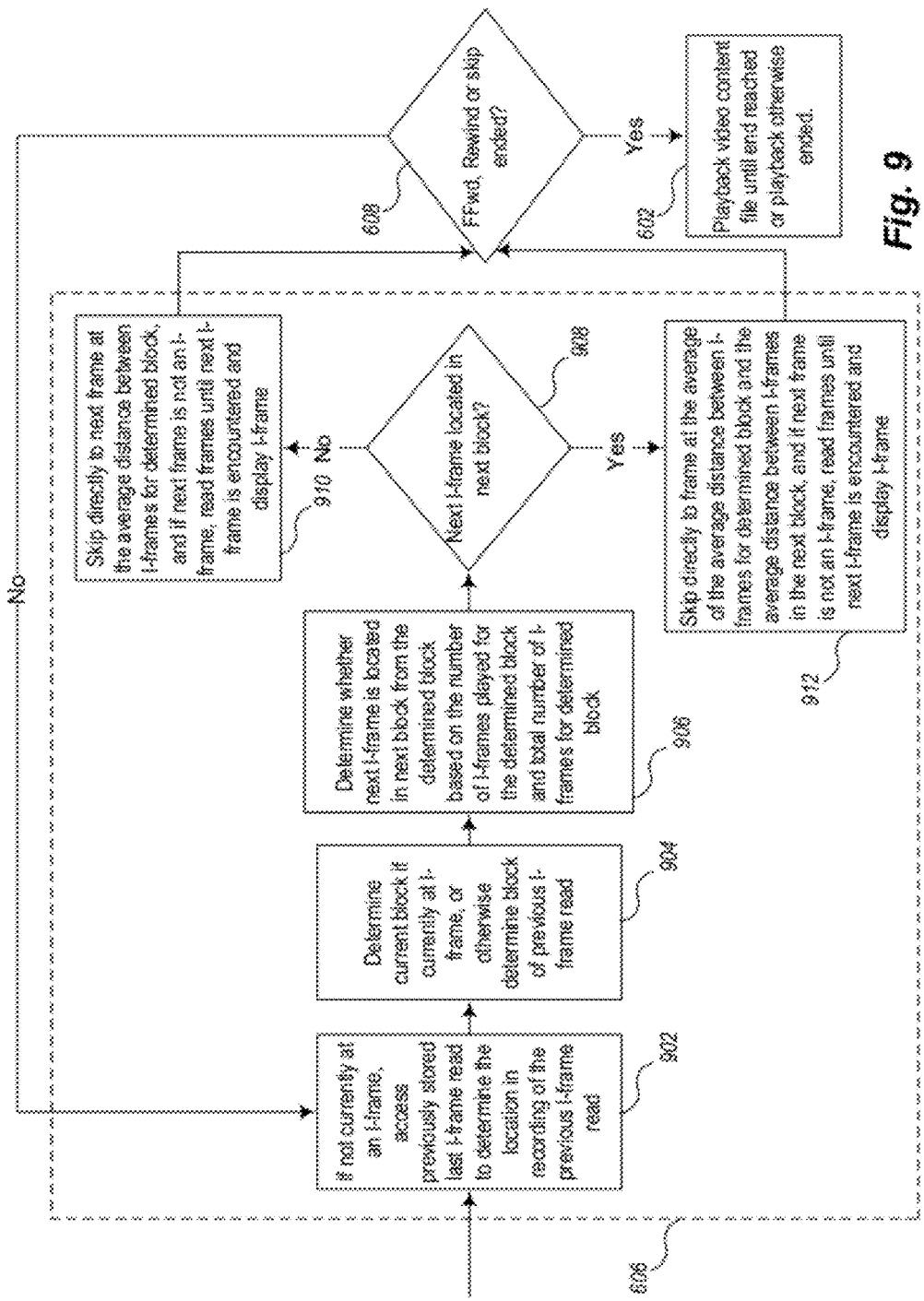
FIG. 9 is a flow diagram of an example playback process during fast forward, rewind or skip provided by another example embodiment.

FIG. 9 is a flow diagram of an example playback process during fast forward, rewind or skip provided by another example embodiment. During forward, rewind or skip, it may often be the case where the average distance between I-frames changes drastically between blocks. If this occurs, it may be advantageous to consider both the average distance between I-frames of the current block and the next block when determining how far to jump in the recording to locate the next I-frame to display. One example process for taking into consideration both the average distance between I-frames of the current block and the next block is shown in FIG. 9.

In particular, an example process performed at 606 of FIG. 6 is shown for accessing the information from the statistics file to find the next I-frame to display based on statistics regarding average distance between I-frames for the current block and next block. Note that variations to the method shown are contemplated and may be used to access the statistics file to find the next I-frame and that the steps shown may be performed in a different order or have additional steps that also facilitate finding the next I-frame to display based on statistics regarding average distance between I-frames.

At 902, if the current frame is not an I-frame, the previously stored last I-frame read is accessed to determine the location in the recording of the previous I-frame read. In one embodiment, this location may be determined by obtaining the presentation time stamp (PTS) for the previous I-frame read, which can be correlated to the position in the recording of the previous I-frame read based on the total number of bytes played to the point of the previous I-frame read. As described below, the location in the recording of the previous I-frame read is used as a reference point to locate the next I-frame to display.

At 904, the current block of the recording is determined if the current frame is an I-frame. Otherwise, the block of the previous I-frame read is determined. The current position in the recording (thus the current block) may be determined in various manners such as obtaining the presentation time stamp (PTS) for the current position in the recording, which can be correlated to the position in the recording based on the total number of bytes played so far. The location in the recording of the previous I-frame read may also be obtained in a similar manner as described above.

At 906 it is determined whether the next I-frame is located in the next block from the determined block based on the number of I-frames played for the determined block and the total number of I-frames for the determined block. For example, the statistics file can also store the total number of I-frames for each block as well as the average distance between I-frames for each block. If the total number of I-frames played for the determined block is equal to the total number of I-frames for that block as found in the statistics file, then, if fast forwarding, the next I-frame to display is located in the next block forward from the determined block.

At 908, if it is determined that the next I-frame is located in the next block from the determined block, then the process continues to 912.

At 912, the average distance between I-frames for the determined block is found in the statistics file. Also, the average distance between I-frames for the next block from the determined block is found in the statistics file. The process skips directly to the next frame from the current position if the current frame is an I-frame, or otherwise from the position of the last I-frame read, in the applicable direction of the current playback mode (e.g., rewind or fast forward), at the average of the average distance between I-frames for the determined block and the average distance between I-frames in the next block from the determined block in the applicable direction of the current playback mode. In particular, the average of the average distance in bytes between I-frames for the determined block and the average distance between I-frames in the next block from the determined block is added to the current position in the recording if the current frame is an I-frame, or otherwise added to the position of the last I-frame read to estimate the location of the next I-frame to display within the next block from the determined block. Each frame is then read starting at the location in the recording to which the process skipped until the next I-frame is encountered. Once encountered, it is displayed (e.g. on the presentation device 212).

If it had been determined at 908 that the next I-frame is not located in the next block, then the process continues to 910.

At 910, the process skips directly to the next frame at the average distance between I-frames for the determined block in the applicable direction of the current playback mode (e.g., rewind or fast forward). In particular, the average distance between I-frames for the determined block is added to the current position in the recording if the current frame is an I-frame, or otherwise added to the position of the last I-frame read to estimate the location of the next I-frame to display. Each frame is then read starting at the location in the recording to which the process skipped until the next I-frame is encountered. Once encountered, it is displayed (e.g. on the presentation device 212).

As shown above, at 608, it is determined whether the fast forward, rewind or skip mode has ended. For example, the mode may end based on input received at the receiving device 118 from the remote control device 128. If it has not ended, the process continues to 902 and repeats locating and displaying I-frames as described above until the particular fast forward, rewind or skip mode has ended as determined at 608. If the fast forward, rewind or skip mode has ended, then the process continues to 602 to playback the recording in normal mode.

While various embodiments have been described hereinabove, it is to be appreciated that various changes in form and detail may be made without departing from the spirit and scope of the invention(s) presently or hereafter claimed.

The invention claimed is:

1. A method for facilitating playing of digital video data comprising:
    reading a plurality of blocks of digital video data;
    calculating the number of reference video frames read within a block of digital video data of the plurality of blocks;
    storing a timestamp associated with the block and corresponding to when the block was finished being read;
    determining statistics associated with the block regarding an average distance between reference video frames within the block in terms of amounts of digital video data between the reference video frames; and
    storing the statistics associated with the block such that the statistics may be accessed during subsequent play of the block of digital video data.

2. The method of claim 1 wherein the reference video frames are intra frames.

3. The method of claim 1, further comprising:
    recording the plurality of blocks resulting in a digital video recording;
    playing back the digital video recording;
    receiving a command to change a mode of playback;
    accessing the stored statistics;

finding an estimated location within the digital video recording, based on the stored statistics accessed, of a next reference frame of the digital video recording to display; and displaying the next reference frame found as a result of the accessing the stored statistics.

4. The method of claim 3, wherein the displaying comprises:

jumping directly to the estimated location;

reading a frame of the digital video recording at the estimated location;

displaying the frame read if the frame read is a reference frame;

continuing to read the next frame in the digital video recording until a reference frame is encountered if the frame read is not a reference frame; and displaying the reference frame encountered.

5. The method of claim 3, further comprising repeating the finding an estimated location and the displaying the next reference frame until a command is received to change the mode of playback.

6. The method of claim 3 wherein the finding an estimated location within the digital video recording comprises:

proceeding to a reference frame, the reference frame at a reference frame location within a current block being played of the digital video recording;

obtaining from the stored statistics an average distance between reference frames within the current block being played; and adding the average distance to the reference frame location within the current block to obtain the estimated location of the next reference frame of the digital video recording to display.

7. The method of claim 3 wherein the finding an estimated location comprises:

determining whether the next reference frame of the digital video recording to display is located within a current block being played or a different block; and if the next reference frame of the digital video recording to display is located within a different block, determining the estimated location based on both an average distance between reference frames within the current block being played and an average distance between reference frames within the different block.

8. A system for playing digital video comprising:

a storage device; and a processor coupled to the storage device, the processor configured to perform:

reading a plurality of blocks of digital video data;

calculating the number of reference video frames read within a block of digital video data of the plurality of blocks;

storing a timestamp associated with the block and corresponding to when the block was finished being read;

determining statistics associated with the block regarding an average distance between reference video frames within the block in terms of amounts of digital video data between the reference video frames; and storing, in the storage device, the statistics associated with the block such that the statistics may be accessed during subsequent play of the block of digital video data.

9. The system of claim 8 wherein the reference video frames are intra frames.

10. The system of claim 8 wherein the statistics associated with the block regarding an average distance between reference video frames also include one or more of: standard deviation statistics for the block regarding distances between reference frames for the block or as compared to other blocks, mean distance between reference frames, percentages of reference frames falling within particular distances of each other, weighted calculations based on a total number of reference frames in the block, ratios of number of reference frames to block size, a measure of volatility regarding number of reference frames encountered between blocks or sub-blocks.

11. The system of claim 8, wherein the processor is further configured to perform:

recording, on the storage device, the plurality of blocks resulting in a digital video recording;

playing back the digital video recording;

receiving a command to change a mode of playback;

accessing the stored statistics;

finding an estimated location within the digital video recording, based on the stored statistics accessed, of a next reference frame of the digital video recording to display; and displaying the next reference frame found as a result of the accessing the stored statistics.

12. The system of claim 11, wherein the command to change a mode of playback is a command to change playback mode to one of: a fast forward mode, a rewind mode or a skip mode.

13. The system of claim 11, wherein the displaying comprises:

jumping directly to the estimated location;

reading a frame of the digital video recording at the estimated location;

displaying the frame read if the frame read is a reference frame;

continuing to read the next frame in the digital video recording until a reference frame is encountered if the frame read is not a reference frame; and displaying the reference frame encountered.

14. The system of claim 11, wherein the processor is further configured to perform repeating the finding an estimated location and the displaying the next reference frame until a command is received to change the mode of playback.

15. The system of claim 11, wherein the finding an estimated location within the digital video recording comprises:

proceeding to a reference frame, the reference frame at a reference frame location within a current block being played of the digital video recording;

obtaining from the stored statistics an average distance between reference frames within the current block being played; and adding the average distance to the reference frame location within the current block to obtain the estimated location of the next reference frame of the digital video recording to display.

16. A non-transitory computer-readable storage medium having computer executable instructions thereon, that when executed by a computer processor cause the following method for facilitating playing of digital video data to be performed:

reading a plurality of blocks of digital video data;

calculating the number of reference video frames read within a block of digital video data of the plurality of blocks;

storing a timestamp associated with the block and corresponding to when the block was finished being read;

determining statistics associated with the block regarding an average distance between reference video frames within the block in terms of amounts of digital video data between the reference video frames; and storing the statistics associated with the block such that the statistics may be accessed during subsequent play of the block of digital video data.

17. The non-transitory computer-readable storage medium of claim 16 wherein the executable instructions thereon, when executed by a computer processor, further cause the following to be performed:

recording the plurality of blocks resulting in a digital video recording;
playing back the digital video recording;
receiving a command to change a mode of playback;
accessing the stored statistics;
finding an estimated location within the digital video recording, based on the stored statistics accessed, of a next reference frame of the digital video recording to display; and
displaying the next reference frame found as a result of the accessing the stored statistics.

18. The non-transitory computer-readable storage medium of claim 17, wherein the displaying comprises:

jumping directly to the estimated location;
reading a frame of the digital video recording at the estimated location;
displaying the frame read if the frame read is a reference frame;
continuing to read the next frame in the digital video recording until a reference frame is encountered if the frame read is not a reference frame; and
displaying the reference frame encountered.

19. The non-transitory computer-readable storage medium of claim 17 wherein the finding an estimated location within the digital video recording comprises:

proceeding to a reference frame, the reference frame at a reference frame location within a current block being played of the digital video recording;
obtaining from the stored statistics an average distance between reference frames within the current block being played; and
adding the average distance to the reference frame location within the current block to obtain the estimated location of the next reference frame of the digital video recording to display.

20. The non-transitory computer-readable storage medium of claim 17 wherein the finding an estimated location comprises:

determining whether the next reference frame of the digital video recording to display is located within a current block being played or a different block; and
if the next reference frame of the digital video recording to display is located within a different block, determining the estimated location based on both an average distance between reference frames within the current block being played and an average distance between reference frames within the different block.

* * * * *